Nov. 11, 1930.    H. S. PETCH ET AL    1,781,555
PROTECTIVE ARRANGEMENT
Filed May 1, 1928
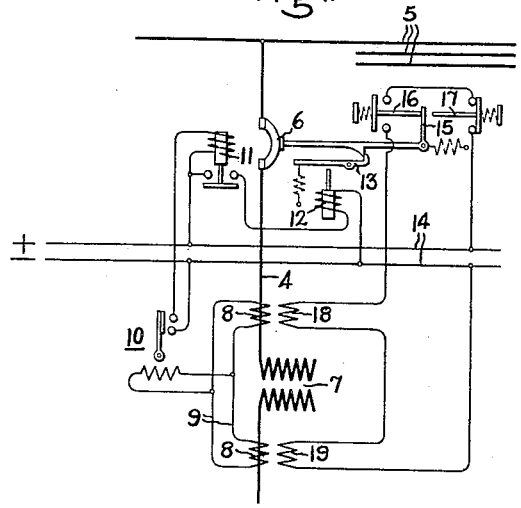
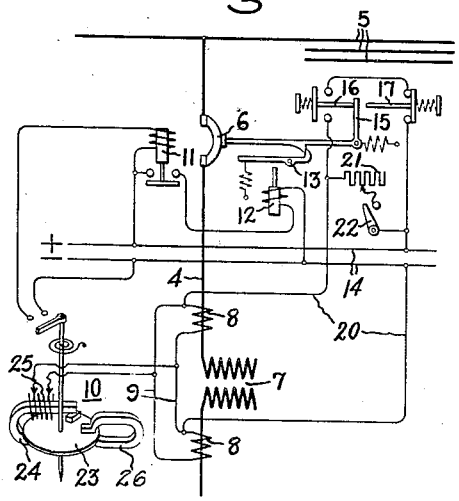
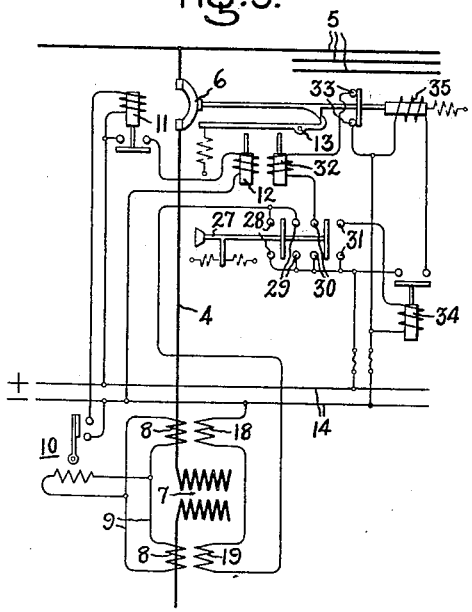
Inventors:
Herbert S. Petch,
John G. Wellings,
by Charles E. Tullar
Their Attorney.

Patented Nov. 11, 1930

1,781,555

UNITED STATES PATENT OFFICE

HERBERT STANLEY PETCH, OF LONDON, AND JOHN GOLE WELLINGS, OF DUNCHURCH, ENGLAND, ASSIGNORS TO GENERAL ELECTRIC COMPANY, A CORPORATION OF NEW YORK

PROTECTIVE ARRANGEMENT

Application filed May 1, 1928, Serial No. 274,313, and in Great Britain May 14, 1927.

Our invention relates to improvements in protective arrangements for electric circuits such as electric machines, transformers, interconnectors, feeders or sections of the same, split-conductors, etc., and an object of our invention is to provide an improved protective arrangement whereby false operation of protective apparatus on transient disturbances is avoided so as better to maintain the desired continuity of service.

On closing a switch on a live circuit, certain phenomena are known to occur whereby abnormal currents of short duration are produced; for instance, those associated with the charging current flowing into a circuit having appreciable capacitance, or the magnetizing current which flows when switching on transformers or other apparatus having highly inductive circuits. These currents depend to a large extent upon the instantaneous value of the voltage at the moment of switching and cannot, therefore, be easily balanced by ordinary protective measures. In circuits having capacitance and inductance, the transient currents may be magnified by resonance. Such transient currents, while in the majority of cases they are not a source of danger to apparatus or plant and need not, therefore, be regarded as faults, frequently give rise to inconvenience due to the operation of overload and/or other forms of protective apparatus. For instance, where a circuit containing a power transformer is protected by a discriminating differential system of protection, the protective apparatus is liable to be actuated by the magnetizing current at the moment of switching the circuit into service. While this difficulty occurs principally on closing the circuit, similar trouble is not unknown on opening the circuit.

In order to avoid this difficulty we propose in accordance with our invention to employ auxiliary windings or an equivalent arrangement connected so as to be energized during the switching in or out of the protected circuit and arranged, when energized, to effect the saturation of the magnetic circuits of the protective apparatus such as current-transformers, relays, etc.

In carrying out our invention, arrangements may be provided whereby auxiliary windings on the current-transformers are adapted to be connected in series or parallel with a suitable source of electric energy, such as a direct current source, during the opening and/or closing movement of the switch such as a circuit breaker controlling the protected circuit. These windings could be energized by means of auxiliary contacts operable by the circuit breaker or through an additional control system, if the circuit breaker is provided with an electromagnetic control.

It will be understood that if used on current transformers the auxiliary windings when energized in this manner, will saturate the cores sufficiently to reduce the out-of-balance outputs of the transformers, due to transient or like current in the protected circuit, to values below those at which protective operation would be effected.

The auxiliary windings may be energized at any time when a reduction in the sensitivity of the protective apparatus is advantageous.

In circulating current protective systems an equivalent arrangement comprises impressing the auxiliary potential directly on to the pilot circuit in the appropriate conditions, so that the ordinary secondary windings of the current transformers now carry the auxiliary current necessary for saturating the cores. The connections are in this case taken to the pilot circuit so that the potential of the equipotential points, to which the protective relay is connected, will not be disturbed.

If the protective system, whether of the opposed voltage or circulating current type, includes an induction disc type of protective relay which is normally not responsive to direct current, and if the impressed electromotive force is D. C. then this auxiliary electromotive force may be impressed directly on the protective circuit in any convenient way without the protective relay being operated.

In a modification of our invention, the protective relay is an induction disk type of relay and it is so arranged that it is unable to operate when a sufficient D. C. potential is impressed on its winding or windings, the saturation of the torque elements of the relay acting to nullify the effect of any alternating current potential which may be applied to the relay winding or windings at the same time. In this case, the auxiliary potential is impressed to saturate the core of the protective relay as necessary, and the core or cores of the current transformer or transformers through which the relay is connected to be fed may or may not be saturated.

Our invention will be better understood from the following description when considered in connection with the accompanying drawing and its scope will be pointed out in the appended claims.

In the accompanying drawing, Fig. 1 illustrates diagrammatically in single phase for clearness, a protective arrangement embodying our invention, and Figs. 2 and 3 illustrate diagrammatically modifications of our invention.

In each of the figures, there is shown a single-phase feeder or other conductor 4 adapted to be connected to one of the busbars 5, by means of a circuit breaker 6. A power transformer 7 is arranged in this feeder, and in all the figures it is shown as being protected by a balanced protective arrangement of the circulating current type. This includes balanced current transformers 8 having their primaries in series with the two windings of the power transformer 7, respectively, and their secondaries connected up to circulate current in a pilot circuit 9 in known manner. The windings of the protective devices such as relays 10, which may be of any suitable type, are shown connected across equipotential points of the pilot circuits 9. The arrangement is such that, in the event of a fault occurring on the power transformer 7, the out-of-balance current flowing in the pilot circuit associated therewith will be diverted through the winding of the associated protective relay 10. This relay being thus energized closes its contacts and thereby effects the energization of the winding of a tripping relay 11 which may be employed to save the more delicate contacts of the protective relay. The tripping relay 11 on being energized to close its contacts completes a circuit for the circuit breaker trip coil 12 whereby the latch 13 is operated in a clock-wise direction to allow the circuit breaker 6 to move to its open position.

In Fig. 1 the circuit breaker 6 is shown as provided with an operating member such as the arm 15 which is arranged to engage with one or the other of the switching devices 16 and 17, according as to whether the circuit breaker is closed or open. Thus, when the circuit breaker 6 is closed the switch 16 is open, when the circuit breaker is open the switch 17 is open, and when the circuit breaker is being moved from closed position to open position, or vice versa, and for a short period both of the switches 16 and 17 are closed. These switches are arranged to control the energization of auxiliary windings 18 and 19 which are here shown connected in series and arranged on the cores of the current transformers 8. In accordance with our invention, the energization of the windings 18 and 19 effects the saturation of the cores of the current transformers 8 in a manner very materially to lower the sensitivity of the protective arrangement. Thus, when the circuit breaker is being opened and/or closed and both of the auxiliary switches 16 and 17 are closed, the windings 18 and 19 are connected to a suitable source such as a D. C. control bus 14. Under these conditions, the cores of the current transformers 8 are so saturated by this direct current source that variations in transformer characteristics, surges due to switching, etc., are ineffective to produce sufficient current to operate the protective relay 10. When the circuit breaker 6 is fully open or closed the windings 18, 19 are de-energized and the relay 10 is again effective to control the circuit breaker.

In the arrangement shown in Fig. 2, the switches 16 and 17 are similar to those described above in connection with Fig. 1, but in this case they are arranged to control the auxiliary energization of the secondary windings of the current transformers 8 directly through a circuit comprising the conductors 20 and the bus 4. These conductors 20 are connected to the pilot circuit 9 in such a manner as not to disturb the potential of the equipotential points in the pilot circuit 9 to which the winding of the protective relay 10 is connected. In this case, therefore, the cores of the current transformers 8 can be saturated by the direct application of potential to their secondary windings during the closing and/or opening movement of the circuit breaker 6 for a short period, when both the auxiliary switches 16 and 17 are simultaneously closed. A further feature, illustrated in this figure is the use of a resistor 21 and a manual switch 22 which, when closed, short-circuits the auxiliary switches 16 and 17. With this arrangement, the closure of the switch 22 reduces the sensitivity of the protective system, and this sensitivity may be adjusted as desired by means of a variable tap on the resistor 21 as shown. Such an arrangement may be of advantage, for example, in testing out protective apparatus. It will, of course, be evident that the feature of the resistor 21 and switch 22 may equally well be applied to the arrangement shown in Fig. 1.

While with the arrangement shown in Fig.

2 the current transformers 8 may be arranged to be saturated during the switching operation of the circuit breaker 6, it is also possible in accordance with our invention, as heretofore outlined, to use a protective relay which is rendered inoperative during the switching operation. For this purpose the protective relay 10 as illustrated in Fig. 2 may be of the shaded pole induction disk type, such as disclosed for example in United States Letters Patent No. 1,539,812 to C. I. Hall, dated May 26, 1925, and assigned to the same assignee as this invention. As shown this relay 10 comprises a disk 23 arranged to be actuated by a shaded pole motor element comprising a magnetic core 24 and a winding 25. A drag magnet 26 may also be provided to produce a time delay. Inasmuch as direct current is not effective to actuate a relay of this type, its core 24 during the switching operation, may be sufficiently energized from the D. C. control bus 14 through the circuit comprising the conductors 20 to saturate the core to such a degree as to prevent operation of the relay by any unbalanced alternating current arising in the pilot circuit 9. With the arrangement shown in Fig. 2, it is therefore possible to prevent false operation of the circuit breaker 6 on transients, by saturation of the magnetic circuits of either the relay 10 or the current transformers 8 or both as desired.

In Fig. 3, the means for saturating the cores of the current transformers 8 include auxiliary windings 18 and 19 thereon arranged as described in connection with Fig. 1. In Fig. 3, moreover, the circuit breaker 6 is arranged to be tripped automatically in response to a fault on the transformer 7 by means of the devices described above in connection with Fig. 1. It is further arranged for electro-magnetic control. For this purpose the control switch 27, which is shown as occupying its neutral position, is arranged to control four sets of contacts 28, 29, 30 and 31. The contacts 28 and 29 are both connected to control the energization of the auxiliary windings 18 and 19, according to which set is closed. Contacts 30 are connected to control a second trip coil 32, which is also arranged to actuate the latch 13. The circuit for the trip coil 32 is arranged to be completed through the circuit breaker auxiliary switch contacts 33 which are closed when the circuit breaker is closed and open when the circuit breaker is open. The contacts 31 are arranged in the circuit of the winding of the closing relay 34, the contacts of which control the closing coil 35.

With this arrangement it will be apparent that if the circuit breaker 6 is automatically tripped in response to a fault on the transformer, the auxiliary windings 18 and 19 will not be energized. The energization of the auxiliary windings 18 and 19 in these conditions is, however, obviously not necessary. If, however, the circuit breaker 6 is closed and has to be opened, through the operation of the control switch 27 to the left thereby closing the contacts 30 in series with the second trip coil 32, the circuit for the auxiliary windings 18 and 19 is established through the closure of the contacts 28. Consequently the protective apparatus will be momentarily rendered less sensitive during the opening of the circuit breaker, that is, just as long as the control switch 27 is held out of its neutral position illustrated. In a similar way, when the circuit breaker 6 is open and is to be closed, the control switch 27 is operated from its neutral position to the right, thus closing the circuit of the winding of the closing relay 34 at the contacts 31, and at the same time effecting the energization of the auxiliary windings 18 and 19 through a circuit from the control bus 14 and including the contacts 29. The contacts 28 may be omitted in cases where it is not desired that the protective apparatus should be rendered less sensitive while the circuit breaker is opening.

While we have shown and described our invention in considerable detail, we do not desire to be limited to the exact arrangements shown, but seek to cover in the appended claims all those modifications that fall within the true spirit and scope of our invention.

What we claim as new and desire to secure by Letters Patent of the United States is:

1. In combination with an alternating current circuit and a switch adapted to be operated to control the circuit, fault responsive protective devices connected to be energized from said circuit for controlling said switch only including current transformers in series relation with said circuit and a relay connected to be energized from said current transformers and means for reducing the sensitivity of one of the protective devices during the switch closing or opening arranged to impress an auxiliary electromotive force on a winding of the device substantially to saturate the magnetic circuit thereof during the switching operation.

2. In combination with a electric circuit and a switch adapted to be operated to control the circuit, current transformers associated with the circuit at each of two points thereof and having their secondaries connected in series, an induction disk relay having a winding connected across normally equipotential points of the secondary circuit of said transformers and means associated with said switch arranged during the operation thereof to impress a D. C. potential on the winding of the relay for saturating the magnetic circuit thereof.

3. In combination with an electric circuit and a switch adapted to be operated to control the circuit, fault responsive protective devices connected to be energized from said circuit for controlling said switch only including two current transformers in series relation with the circuit and a relay connected to be energized from said current transformers, means associated with the switch for reducing the sensitivity of one of the protective devices during switch closing or opening arranged to impress a D. C. potential on the winding of the device substantially to saturate the magnetic circuit thereof.

4. In combination with an electric circuit and a switch adapted to be operated to control the circuit, fault responsive protective means for controlling said switch including a relay operative only on alternating current and means for reducing the sensitivity of the relay during operation of said switch arranged to impress an auxiliary potential on a winding of the relay.

5. In combination with an electric circuit and a switch adapted to be operated to control the circuit, fault responsive protective means for controlling said switch including an induction disk relay and means for reducing the sensitivity thereof during the opening or closing of the switch arranged to impress a D. C. potential on a winding of the relay.

6. In combination with an electric circuit and a switch adapted to be operated to control the circuit, fault responsive protective means for controlling said switch including an induction disk relay and means for reducing the sensitivity thereof during the opening or closing of the switch arranged substantially to saturate the magnetic circuit of the relay during the switching operation.

In witness whereof we have hereunto set our hands this 13th day of April, 1928.

HERBERT STANLEY PETCH.
JOHN GOLE WELLINGS.